US008676706B2

(12) United States Patent
Jones et al.

(10) Patent No.: US 8,676,706 B2
(45) Date of Patent: Mar. 18, 2014

(54) ONLINE CHECK REGISTER USING CHECK IMAGING (75) Inventors: Alicia C. Jones, Fort Mill, SC (US); Zhongmin Agarwal, Charlotte, NC (US); Mark D. Zanzot, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 420 days.

(21) Appl. No.: 12/847,622

(22) Filed: Jul. 30, 2010

(65) Prior Publication Data

US 2012/0030105 A1 Feb. 2, 2012

(51) Int. Cl.
*G06Q 40/00* (2012.01)

(52) U.S. Cl.
USPC ............................................. 705/42; 705/35

(58) Field of Classification Search
USPC .......................................................... 705/35
See application file for complete search history.

(56) References Cited

U.S. PATENT DOCUMENTS

| | | | | |
|---|---|---|---|---|
| 4,737,911 | A * | 4/1988 | Freeman, Jr. | 705/33 |
| 5,233,547 | A * | 8/1993 | Kapp et al. | 708/106 |
| 6,431,439 | B1 * | 8/2002 | Suer et al. | 235/380 |
| 7,290,704 | B1 | 11/2007 | Ball et al. | |
| 8,025,218 | B2 * | 9/2011 | Carpenter et al. | 235/379 |
| 8,121,944 | B2 * | 2/2012 | Norman et al. | 705/40 |
| 2003/0007676 | A1 | 1/2003 | Cato | |
| 2003/0126082 | A1 * | 7/2003 | Omura et al. | 705/42 |
| 2004/0002926 | A1 * | 1/2004 | Coffy et al. | 705/401 |
| 2004/0236647 | A1 * | 11/2004 | Acharya | 705/30 |
| 2006/0015428 | A1 * | 1/2006 | Friedman | 705/35 |
| 2007/0100749 | A1 * | 5/2007 | Bachu et al. | 705/42 |
| 2007/0285723 | A1 | 12/2007 | Fabel et al. | |
| 2008/0091603 | A1 | 4/2008 | Page | |
| 2008/0140552 | A1 | 6/2008 | Blaikie | |
| 2008/0215377 | A1 * | 9/2008 | Wottowa et al. | 705/4 |
| 2008/0249931 | A1 * | 10/2008 | Gilder et al. | 705/39 |
| 2009/0024520 | A1 | 1/2009 | Drory et al. | |
| 2010/0027896 | A1 * | 2/2010 | Geva et al. | 382/229 |
| 2010/0280859 | A1 * | 11/2010 | Frederick, II | 705/7 |
| 2011/0071934 | A1 * | 3/2011 | Brown et al. | 705/35 |
| 2011/0270750 | A1 * | 11/2011 | Abrams et al. | 705/41 |

OTHER PUBLICATIONS

International Search Report and Written Opinion of the International Searching Authority for International Application No. PCT/US2010/033191 mailed Jun. 29, 2010.
International Preliminary Report on Patentability for International Application No. PCT/US2010/033191 mailed Nov. 10, 2011.

* cited by examiner

*Primary Examiner* — William Rankins
(74) *Attorney, Agent, or Firm* — Michael A. Springs; Moore & Van Allen PLLC; Padowithz Alce (57) ABSTRACT Embodiments of the invention relate to systems, methods, and computer program products for maintaining an updated check register in connection with an online banking account of a payor that tracks pending check payments using check imaging technology. Some embodiments of the present invention provide a computer-implemented method including the following steps: receiving an image of at least a portion of a paper check, wherein the portion comprises an indication of an amount of money to be drawn on a financial account, processing the image to determine the amount, identifying the financial account, and recording the amount in connection with the financial account, wherein the recording step occurs prior to receiving any indication that the check has been presented for payment. In addition, the method may also include making the financial account with an indication of the pending payment available to be viewed by the payor.

32 Claims, 3 Drawing Sheets

ONLINE CHECK REGISTER USING CHECK IMAGING

FIELD

In general terms, embodiments of the present invention relate to systems, methods and computer program products for maintaining accurate financial information in connection with a financial account, and in particular, embodiments of the present invention relate to systems, methods and computer program products for maintaining an updated check register in connection with an online banking account of a payor that tracks pending check payments using check imaging technology.

BACKGROUND

Consumers have a variety of digital tools available to them which allow them to manage their financial accounts. For example, transaction summaries and account balance information are generally available in online banking accounts accessible to consumers via personal computers and mobile communication devices. At any time, a consumer that has enrolled in online banking with her financial institution may log into her online banking account and view up-to-date information about her various financial accounts with that institution, such as past and pending purchases, deposits and transfers. With the widespread use of credit cards, debit cards, inter-institution transfers, online payment accounts, and other payment methods that, as part of processing of a transaction, include communication with a financial institution holding the account used in the transaction, the consumer's online account is generally updated in real-time (i.e. at the time of a transaction) or near real-time to include either a completed debit or credit, or a pending debit or credit. Because of this capability, many consumers find that their online banking account is an adequate substitute for manually maintaining a register of transactions for each financial account. Thus, in determining the funds available to them, many consumers rely entirely on the account balance and transaction information that they can readily access in online banking. While relying solely on the information available in online banking to determine the balances and other status of their financial accounts may be a suitable solution for those consumers that only engage in transactions using payment methods that immediately impact the financial account, for those consumers that still use paper checks for payments and purchases, there are a number of drawbacks to this approach.

Unlike the real-time and digital payment methods that have become commonplace today, payment by traditional paper checks does not generate any record, electronic or otherwise, at the time of payment (transfer of the check from payor to payee), or necessitate immediate use of any computer network in communication with the financial institution holding the account on which the check is drawn. For example, a payor may write and deliver a paper check to a payee on a particular date, and the payee may wait two weeks before depositing or cashing the check. During that two-week period, the check will not appear as a pending payment in the online banking account of the payor. Indeed, the financial institution will have no record of the payment whatsoever and will not even be aware that the payment has been made. Thus, if the payor forgets about the check and relies upon the balance information in online banking to ascertain her available funds, she will overestimate the amount of funds available to her for spending and could inadvertently result in exceeding the balance in overdraw her account when the check is eventually processed when the payee deposits or cashes it. Therefore, there remains a need for an improved system for maintaining an updated check register in connection with an online banking account that tracks pending check payments.

SUMMARY OF EMBODIMENTS OF THE INVENTION

Embodiments of the invention relate to systems, methods, and computer program products for maintaining an updated check register in connection with an online banking account of a consumer that tracks pending check payments. Some embodiments of the present invention provide a system including the following: a communication device configured to receive images, a storage device comprising information stored therein relating to a financial account associated with a payor and computer readable program code stored on the storage device or a separate storage device, and a processor communicably coupled to the storage device or storage devices, wherein the computer readable program code comprises instructions that when operated by the processor, causes the processor to operate the communication device to receive an image of at least a portion of a check, wherein the portion comprises an indication of an amount of money to be drawn on the financial account, process the image to determine the amount, and amend the information relating to the financial account to include the amount prior to receiving any indication that the check has been presented for payment.

In some embodiments, the computer readable program code comprises further instructions that when operated by said processor, causes the processor to identify the financial account using the image. In some embodiments, the computer readable program code comprises further instructions that when operated by said processor, causes the processor to identify the financial account using information attendant to transmission of the image to the system. In some embodiments, the information attendant to the transmission of the image comprises information relating to an address from which the image was transmitted. In other embodiments, the information attendant to the transmission of the image comprises information obtained by the system when the payor logs onto an online banking account. In some embodiments, the processor amends the information relating to the financial account to include the amount as a pending payment to be drawn on the financial account.

In some embodiments, the computer readable program code comprises further instructions that when operated by said processor, causes the processor to make the information relating to the financial account, including the amount, available to be viewed by the payor prior to receiving any indication that the check has been presented for payment. In some embodiments, the processor amends the information relating to the financial account to include reduce the value of funds available in the financial account by the amount. In some embodiments, the computer readable program code comprises further instructions that when operated by said processor, causes the processor to operate the communication device to receive an indication that a check has been presented by a payee for payment, determine that the check presented for payment is the same as the check, draw the amount of the check from the financial account, and amend the information relating to the financial account to include the amount of the check as a debit to the financial account.

In some embodiments, the computer readable program code comprises further instructions that when operated by said processor, causes the processor to operate the communication device to receive a second image of at least a portion of the check, and compare the second image to the image to validate the check. In some embodiments, the computer readable program code comprises further instructions that when operated by said processor, causes the processor to determine that a predefined time period has passed since the image was received, determine that no indication that the check has been presented by a payee has been received, and communicate to the payor a notification that the check has not yet been processed for payment.

Some embodiments of the present invention provide a computer-implemented method including the following steps: receiving an image of at least a portion of a paper check, wherein the portion comprises an indication of an amount of money to be drawn on a financial account, processing the image to determine the amount, identifying the financial account, and recording the amount in connection with the financial account, wherein the recording step occurs prior to receiving any indication that the check has been presented for payment. In some embodiments, the method further includes making the financial account with an indication of the pending payment available to be viewed by the payor. In some embodiments, the method further includes: receiving an indication that a check has been presented by a payee for payment, determining that the check presented for payment is the same as the check, drawing the amount of the check from the financial account, and updating the information stored in connection with the financial account so that the amount of the check is recorded as a debit to the financial account. In some embodiments, the method further includes receiving a second image of at least a portion of the check and comparing the second image to the image to validate the check.

In some embodiments, the method further includes determining that a predefined time period has passed since said recording step, determining that no indication that the check has been presented by a payee has been received, and communicating to the payor a notification that the check has not yet been processed for payment. In some embodiments, the image is received from the payor via a network. In some embodiments, the image was taken using a mobile communication device associated with the payor. In some embodiments, the financial account is identified by processing the portion of the image to determine a number associated with the financial account. In some embodiments, the financial account is identified based on information relating to the transmission of the image. In some embodiments, the information attendant to the transmission of the image comprises information relating to an address from which the image was transmitted. In other embodiments, the information attendant to the transmission of the image comprises information obtained by the payor logging onto an online banking account. In some embodiments, making the pending payment available to be viewed by the payor includes reducing the value of funds available in the financial account by the amount.

Some embodiments of the present invention provide a computer program product including a computer-readable medium having computer-executable computer program code portions stored therein, wherein the computer-executable program code portions includes: a first program code portion configured to receive an image of at least a portion of a check, wherein the portion comprises an indication of an amount of money to be drawn on a financial account associated with a payor, a second program code portion configured to process the image to determine the amount, a third program code portion configured to identify the financial account from which the amount will be drawn after the check is presented for payment, and a fourth program code portion configured to record in connection with the financial account the amount of the check as a pending payment, wherein said recording step occurs prior to receiving any indication that the check has been presented for payment. In some embodiments, the computer-executable program code portions also include a fifth program code portion configured to make the pending payment available to be viewed by the payor through an online banking application.

Some embodiments of the present invention provide a system including the following: an image capturing device configured to capture images, a communication device configured to receive images, a storage device comprising information stored therein relating to a financial account associated with a payor, and computer readable program code stored on the storage device or a separate storage device; and a processor communicably coupled to the storage device or storage devices, wherein the computer readable program code includes instructions that when operated by the processor, causes the processor to operate the communication device to receive an image of at least a portion of a check, wherein the portion comprises an indication of an amount of money to be drawn on the financial account, process the image to determine the amount, and amend the information relating to the financial account to include the amount prior to receiving any indication that the check has been presented for payment. In some embodiments, the image capturing device comprises a camera on a mobile communications device. In some embodiments, the mobile communications device is configured to transmit images to said communications device.

Some embodiments of the present invention provide a computer-implemented method including the following steps: capturing an image of at least a portion of a paper check, wherein the portion comprises an indication of an amount of money to be drawn on a financial account, transmitting the image to a processing device configured to process the image to determine the amount, identifying the financial account, and recording the amount in connection with the financial account, wherein said recording step occurs prior to receiving any indication that the check has been presented for payment. In some embodiments, the method further includes making the financial account with an indication of the pending payment available to be viewed by the payor. In some embodiments, the image is captured using a camera on a mobile communications device. In some embodiments, the image is transmitted via a network.

BRIEF DESCRIPTION OF THE DRAWINGS

Having thus described embodiments of the invention in general terms, reference will now be made to the accompanying drawings:

DETAILED DESCRIPTION OF EMBODIMENTS OF THE INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and/or vice versa, unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a non-transitory computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Figure 1:
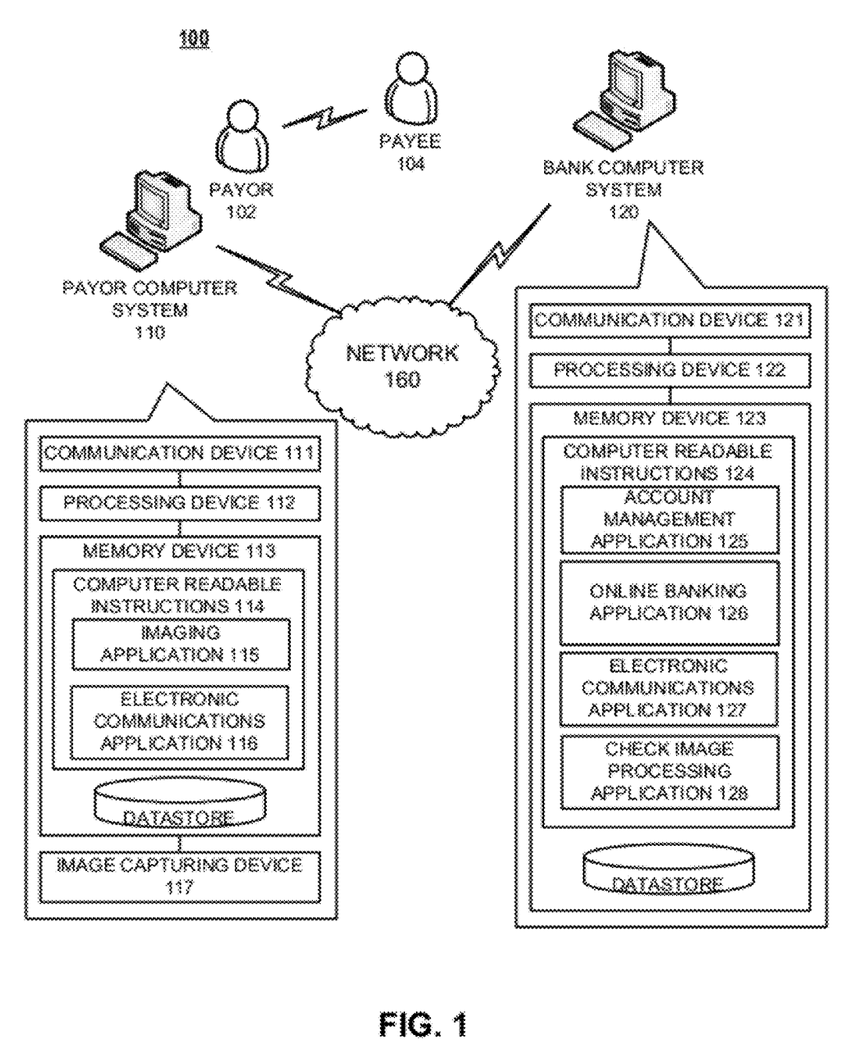
FIG. 1 illustrates a system and an environment in which the system exists and the methods described herein are implemented according to an embodiment of the invention.

Referring now to FIG. 1, an exemplary online check register system 100 environment in which an embodiment of the present invention exists. As shown in FIG. 1, in one embodiment, the online check register system 100 includes a payor computer system 110 and a bank computer system 120. Although, for simplicity, FIG. 1 only illustrates one of each computer system, it will be appreciated that, in some embodiments of the invention, there will be many payor computer systems 110 and/or many bank computer systems 120. Furthermore, although the term "bank" is used herein to describe some embodiments of the invention, other embodiments of the invention many involve other financial institutions in addition to or as an alternative to a bank. As used herein and in the claims, the term "financial institution" refers to an institution that maintains financial accounts for its clients or members that may be used to make payments using paper checks. As such, the bank computer system 120 of FIG. 1 could be the computer system of another financial institution involved in banking or other financial transactions, but not traditionally thought of as a bank. Further, although many of the embodiments of the present invention described herein are generally described as involving a "bank" or a "financial institution," other embodiments of the present invention may involve one or more persons, organizations, businesses, and/or or other entities that take the place of, or work in conjunction with, the financial institution to implement one or more of the embodiments described herein as being performed by the financial institution.

Referring again to the embodiment illustrated in FIG. 1, the payor computer system 110 is operatively coupled, via a network 160, to the bank computer system 120. The network 160 may be a global area network (GAN), such as the Internet, a wide area network (WAN), a local area network (LAN), or any other type of network or combination of networks. The network 160 may provide for wireline, wireless, or a combination of wireline and wireless communication between devices in the network. It will be understood that when two components are described herein as communicating over a network, the components may be directly coupled to each other or indirectly coupled via one or more other components. Furthermore, although at least some of the systems described herein are described as having several unique components, these components need not be separate and distinct from one another, and two or more of such components may, in some embodiments, be combined into a single component that performs all of the functions of the multiple components so combined as described herein.

As illustrated in FIG. 1, the payor computer system 110 generally comprises a communication device 111, a processing device 112, a memory device 113, and an image capturing device 117. The processing device 112 is operatively coupled to the communication device 111, the memory device 113, and the image capturing device 117. The processing device 112 uses the communication device 111 to communicate with the bank computer system 130 over the network 160. The processing device 112 also uses the communication device 111 to communicate with the payor 102. As such, the communication device 111 generally comprises a modem, server, wireless card, radio, and/or other device for communicating with other devices on the network 160, and a display, mouse, keyboard, microphone, touch pad, touch screen, speaker, and/or other device for communicating with the payor 102.

As used herein and in the claims, the term "processing device" generally refers to circuitry used for implementing communication and logic functions of the system in which it resides. A processing device may include, for example, a digital signal processor device, a microprocessor device, and various analog-to-digital converters, digital-to-analog converters, and other support circuits. Control and signal processing functions of a system are allocated between these processing devices according to their respective capabilities. The processing device may also include functionality to operate one or more computer applications based on computer-readable instructions (i.e., computer program code) thereof, which may be stored in a memory device in communication therewith. As used herein and in the claims, the term "memory device" generally refers to any device having computer-readable medium configured to store, for example, data and/or one or more computer applications.

As further illustrated in FIG. 1, the payor computer system 110 includes computer-readable instructions 114 stored in the memory device 113, which include the computer-readable instructions 114 of an imaging application 115 and an electronic communications application 116. In some embodiments, the imaging application 115 is an application that is configured to assist the user in capturing an image of a check. For example, the imaging application 115 may be utilized by a user of the image capturing device 117 to capture an image of a check. In other embodiments, the imaging application 115 is an application configured to assist the user of the image capturing device 117 to capture an image of a check from the image capturing device 117, process the image to enhance and optimize the image for extraction of the financial transaction data, and/or instruct the communication device 111 to communicate the enhanced image to the bank computer system 120 for processing. In still other embodiments, the imaging application 115 is an application configured to assist the user of the image capturing device 117 to capture an image of a check from the image capturing device 117, process the image to extract the financial transaction data on the check (such as amount, date, account number, check number, payee, etc.), and instruct the communication device 111 to transmit the financial transaction data to the bank computer system 120. In some embodiments, the imaging application 115 is a customized application that the bank may provide for the payor 102 to download onto the payor computer system 110.

The electronic communications application 116 includes one or more computer programs that, when executed by the processing device 112, allow the payor 102 to receive, store, and transmit electronic messages or access a website utilizing the communication device 111. For example, in one embodiment of the present invention, the electronic communications application 116 may include an email application, a multimedia messaging application, and/or a web browser application. Indeed, in some embodiments, the electronic communications application 116 includes an Internet browsing application or other application that allows the user to access the online banking application 126 operated by the bank computer system 120. In some embodiments, the electronic communications application 116 is an application configured to receive an image of a check from the image capturing device 117 (perhaps captured through utilization of the imaging application 115) and instruct the communication device 111 to transmit the image to the bank computer system 120 for processing. In some embodiments, the electronic communications application 116 is a customized application that the bank may provide for the payor 102 to download onto the payor computer system 110. In some embodiments, the functions of the electronic communications application 116 and the imaging application 115 are combined into one overall application that performs the functions described herein.

In one embodiment, the payor computer system 110 is a personal desktop computer. In other embodiments, however, the payor computer system 110 is a mobile computing device, which may include, for example, a mobile telephone, a personal digital assistant, a mobile picture taking device, a laptop computer, a mobile email device, a mobile texting device, a mobile music device, a wrist computer, and/or any other mobile terminal. It should be understood that FIG. 1 illustrates only one embodiment of the online check register system 100 of the present invention, and that, according to some embodiments, the payor computer system 110 may include more or less components and/or the shown components of the payor computer system 110 may be in more than one device or apparatus.

According to some embodiments, the image capturing device 117 is any device that is capable of capturing an image, such as a camera. For example, where the payor computer system 110 is a mobile computing device, such as a mobile telephone or other mobile communications device, the image capturing device 117 may be a camera that is incorporated into such device. While the image capturing device 117 is shown in FIG. 1 as being a part of the payor computer system 110, the camera does not necessarily have to be an integral component of another apparatus within the payor computer system 110. For example, the image capturing device 117 may be a separate digital camera that can be used to capture images and transmit the captured images, or copies thereof, to be stored in the memory device 113 of the payor computer system 110 for use, whether by uploading via a direct connection such as a cable or by transmission through a network, including the network 160.

As illustrated in FIG. 1, the bank computer system 120 generally includes a communication device 121, a processing device 122, and a memory device 123. The processing device 122 is operatively coupled to the communication device 121 and the memory device 123. The processing device 122 uses the communication device 121 to communicate with the payor computer system 110 via the network 160. As such, the communication device 121 generally comprises a modem, server, wireless card, radio or other device for communicating with other devices on the network 160.

As further illustrated in FIG. 1, the bank computer system 120 includes computer-readable instructions 124 stored in the memory device 123, which include the computer-readable instructions 124 of an account management application 125, an online banking application 126, an electronic communications application 127, and a check image processing application 128. The account management application 125 includes one or more computer programs that, when executed by the processing device 122, perform standard account management functions such as debiting and crediting accounts, entering pending payments and deposits into the account register, placing holds on accounts, and other actions based on transactions engaged in by account holders such as payor 102. The online banking application 126 supports an interactive web-based service that may be utilized by account holders to view their various accounts and perform certain transactions, such as balance and transaction inquiries, fund transfers, bill payments, etc. The electronic communications application 127 includes one or more computer programs for receiving, storing, and transmitting electronic messages utilizing the communication device 121. Finally, the check image processing application 128 includes one or more computer programs for processing an image of a check in order to extract financial transaction data from the check and supplying the extracted data to the online banking application 126 so that it may be associated with the account of the appropriate payor. Although FIG. 1 illustrates the bank computer system 120 as one system, it is important to note that there can be one or multiple systems, each with similar components that handle the various functions of the bank computer system 120.

Figure 2:
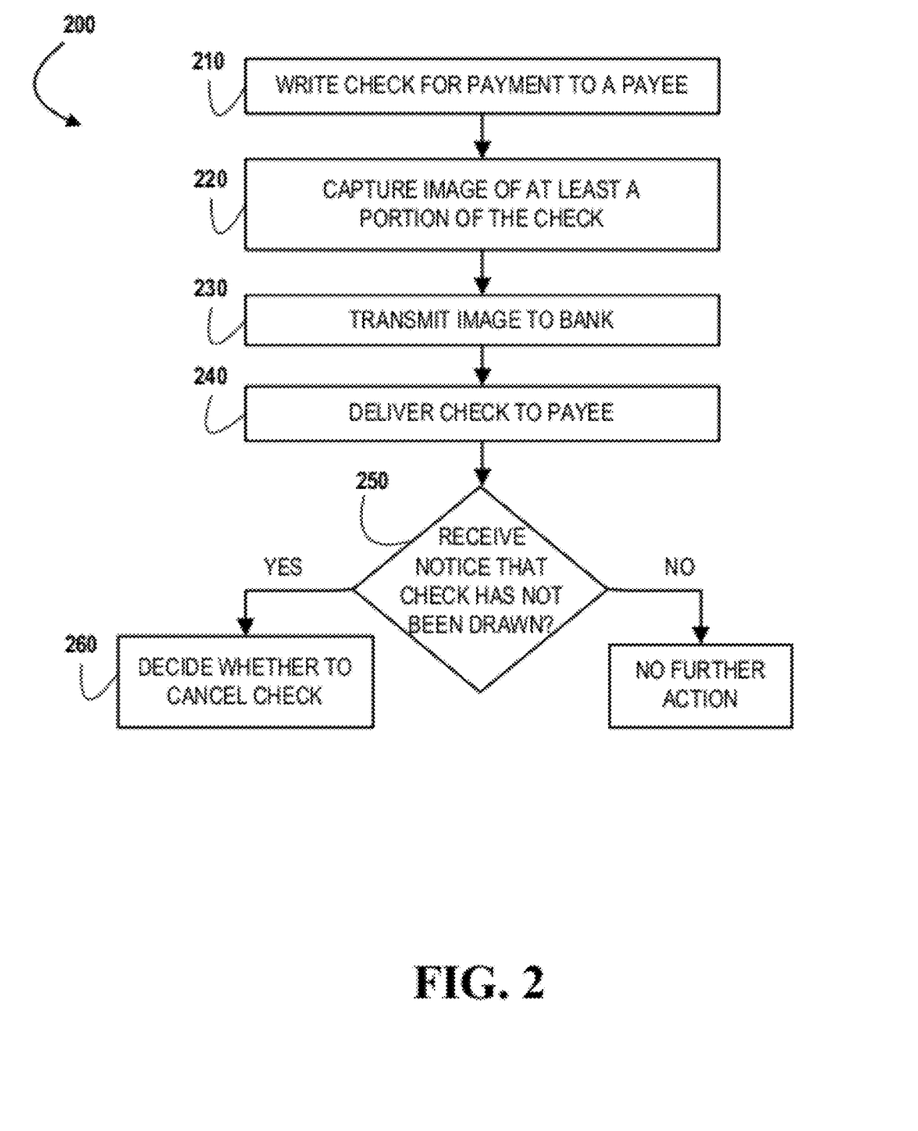
FIG. 2 is a flow chart illustrating an exemplary method of maintaining an updated check register in connection with an online banking account, from the perspective of a payor, in accordance with an embodiment of the invention.
Figure 3:
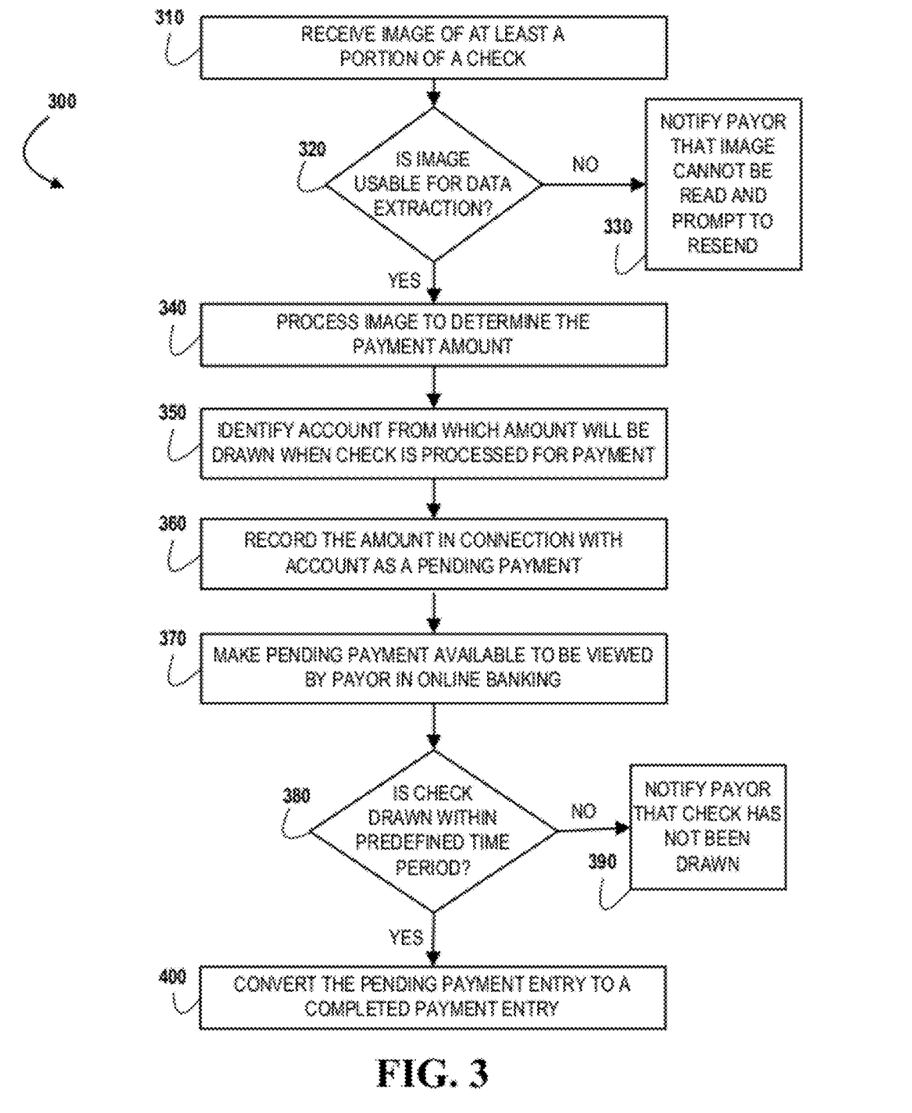
FIG. 3 is a flow chart illustrating an exemplary method of maintaining an updated check register in connection with an online banking account from the perspective of a financial institution, in accordance with an embodiment of the invention.

With reference now to FIGS. 2-3, embodiments of the processes of embodiments of the present invention are illustrated. In this regard, FIGS. 2 and 3 are flowcharts illustrating one embodiment of the present invention from the perspectives of the payor 102 and the bank (as defined below), respectively. More particularly, FIG. 2 provides a flow chart illustrating an exemplary method 200 of maintaining an updated online check register, from the perspective of a payor, in accordance with an embodiment of the invention. FIG. 3 provides a flow chart illustrating an exemplary method 300 of maintaining an updated online check register, from the perspective of a financial institution, in accordance with an embodiment of the invention.

A shown in block 210 of FIG. 2, according to some embodiments, the payor 102 writes a check to a payee 104 for payment of some amount of money. As used herein, a "check" means a paper instrument that orders the payment by a bank of a particular sum of money. A check generally includes, among other items, a written amount, which is the amount of money to be paid, and a number that identifies the financial account of the payor of the check held by the bank, from which the amount is to be drafted when the bank makes the payment ordered by the check. The payor 102 may be an individual, a collection of individuals, or any other entity, such as a business or non-profit. Indeed, the payor 102 may be any entity that holds a financial account from which payments may be made utilizing paper checks. The payee 104 may likewise be any type of entity, including an individual or business. As used herein, the "bank" is a financial institution that manages the financial account of the payor 102 from which payments may be made utilizing checks.

As shown in block 220, prior to delivering the check to the payee 104, the payor 102 captures an image of at least a portion of the check. More particularly, the payor 102 utilizes the image capturing device 117 of the payor computer system 110 to capture the image of at least a portion of the check. In one embodiment, the payor computer system 110 is a mobile computing device, such as a mobile telephone, a laptop, a digital camera having network communications capabilities, or other personal computing device, and the payor 102 utilizes a camera on the mobile computing device to capture the image. In another embodiment, the payor 102 utilizes a digital camera that is not integral with the other components of the payor computer system 110 to capture the image. According to some embodiments, the payor 102 may capture an image that includes the entire check, or just a portion thereof, as long as the portion captured is sufficient to enable processing of the image as described below. The payor 102 may capture more than one image of the check, for example, an image of the front of the check and an image of the back of the check.

According to some embodiments, the payor 102 may utilize the imaging application 115 in order to capture the image of the check. For example, prior to capturing the image, the payor 102 may access the imaging application 115 on the payor computer system 110. In some embodiments, the payor 102 may have to input credentials via the communication device 111 in order to access the imaging application 115. The imaging application 115 may instruct the processing device 112 to instruct the communications device 111 to prompt the payor 102 to either take a picture of the check, or if the image capturing device or other aspect of the payor computer system 110 is capable, scan all or a portion of the check. The imaging application 115 may be configured to instruct the processing device 112 to review the image or scanned portion to determine if the image or scanned portion is sufficient in substance and quality to enable processing that will identify the relevant financial transaction data on the check, including one or more of the following: the amount of the check, the financial account of the payor 102 from which that amount will be drafted following presentation by the payee 104, the identification of the payee, the date of the check, and the check number. In the event the image or scanned portion is insufficient, the imaging application 115 may instruct the processing device 112 to instruct the communications device 111 to prompt the payor 102 to retake the picture or scan, and may provide instructions and/or other direction that will assist the payor 102 in doing so. For example, the instructions may include instructions as to how to direct or focus the camera, or what portions of the check to include in the image or scan.

According to some embodiments, in addition to assisting the payor 102 with capturing an image of the check that will be processed to identify the relevant financial transaction data, the imaging application 115 may further provide some actual processing functions. For example, the imaging application 115 may instruct the processing device 112 to enhance the image in order to prepare it for further processing at the bank. Such enhancement may include cleaning the image by performing auto-rotation, de-skewing, perspective distortion correction, cropping, etc. as well as production of bi-tonal or gray-scale images using the image. These enhancement functions prepare the image for extraction of the necessary transaction data, including the amount and the financial account from which the amount will be drawn. In other embodiments, the imaging application 115 may instruct the processing device 112 to extract that transaction data from the enhanced check image. In such embodiments, the imaging application 115 is configured to review the image of the check, identify the check amount and the relevant payor financial account, and prepare to transmit that relevant financial transaction data to the bank. In some embodiments, the imaging application 115, whether such application is incorporated into the electronic communications application 116 or is a separate application, is a customized application offered by the bank to the payor 102. For example, the payor 102 may download the application onto the payor computer system 110 from the bank computer system 120 over the Internet. The application may be offered for download on the online banking application 126. Thus, according to some embodiments, the payor 102 utilizes a previously downloaded application to capture an image of a check and/or process a captured image of a check.

Next, as shown in block 230, the payor 102 transmits the image of the check to the bank. In particular, the payor 102 utilizes the electronic communications application 116 to transmit the image of the check to the bank. The electronic communications application 116 instructs the communications device 111 to send the image to the bank computer system 120 via the network 160. The image transmitted may be the unaltered image of the check as originally captured by the payor 102, or may be the image as enhanced by the imaging application 115. Indeed, as used herein, the "image" transmitted to and processed by the bank means either the original image or any copy of the image, including any enhanced version of the image. According to different embodiments, the image may be transmitted by MMS (multimedia messaging service) or as an attachment to an email. In some embodiments, either the electronic communications application 116 or the imaging application 115 is configured to utilize the communications device 111 to transmit the image to a particular telephone number or email address associated with the bank computer system 120. Indeed, in those embodiments where the electronic communications application 116 and/or the imaging application 115 is a customized application provided by the bank and downloaded by the payor 102 from the bank computer system 120, perhaps from the online banking application 126, destination information for the image (including telephone number, email address etc.) has been stored in the memory device 113 of the payor computer system 110 and is retrieved and utilized for transmission by the electronic communications application 116 or the imaging application 115 following the capturing and, if applicable, approval, of an image of a check. In other embodiments, the check image is uploaded to the online banking account of the payor 102 by accessing the online banking application 126 through the Internet. In other embodiments, the check image may be uploaded to another location in the online banking application 126 by the payor 102.

In some embodiments, rather than an image being transmitted to the bank computer system 120, financial transaction data, including check amount and payor financial account number, extracted from the image may be transferred instead. In such embodiments, as discussed above, the imaging application 115 is configured to extract the data from the image, rather than simply assist with capturing and/or enhancing the image to prepare it for processing by the bank.

Referring now to FIG. 3, as shown in block 310, according to some embodiments, the bank receives the captured image. In particular, the bank computer system 120 receives, via the communication device 121, the image transmitted by the payor computer system 110 via the network 160. Next, as shown in block 320, the bank computer system 120 makes a determination as to whether the image is sufficient in content and quality to allow the bank computer system, via the check image processing application 128 to process it and extract the necessary financial transaction data, including the amount appearing on the face of the check. In some embodiments, the check image processing application 128 is configured to do a precursory scan of the image to determine if it meets predefined quality standards that are required to extract data from the image. In other embodiments, the determination may be made as the image undergoes the processing described below with respect to block 340. In either instance, in the event the check image processing application 128 determines that the image is not sufficient to allow accurate data extraction, the check image processing application 128 may, as shown in block 330, instruct the processing device 122 to communicate a notification to the payor computer system 110 via the communications device 121 that informs the payor 102 that the image was insufficient and prompts the payor 102 to capture another image. The notification may further include instructions directed to the payor 102 that will assist the payor 102 in taking an image that will be sufficient for data extraction and processing by the bank computer system 120.

According to some embodiments, and as shown in block 340, the image received from the payor computer system 110 is processed to determine the check amount. In particular, the check image processing application 128 accesses the received check image, cleans and enhances it, and then extracts from the cleaned image the check amount. In some embodiments, the check image processing application 128, the account management application 125, the electronic communications application 127, and/or the online banking application 126 is configured to initiate processing of the check image following receipt by the bank communication system 120. For example, in one embodiment, the check image processing application 128 may be configured to interface with or periodically check one or more inboxes within the bank computer system 120 (for example, email or MMS inboxes) that receive check images from account holders of the bank. When a check image is received into one or these inboxes, the check image processing application 128 or the electronic communications application 127 may be configured to initiate processing of the image by the check image processing application 128. In another embodiment, the online banking application 126 may be configured to manage the receipt of check images uploaded to the bank computer system 120 via the network 160 through use of the online banking application 126. The online banking application 126 may store these received images in an area for access by the check image processing application 128 or actively transmit the images to another location within the bank computer system 120 for processing by the check image processing application 128.

According to some embodiments, the check image processing application 128 first processes the image by performing a number of tasks with respect to the image in order to clean and enhance it prior to extraction of the relevant financial transaction data appearing on the check. In particular, the check image processing application 128 may be configured to perform tasks directed to automatically detecting the check within the image, geometrically correcting the image, binarization of the image, and correcting the orientation and size of the image. Such tasks may include cleaning the image by performing auto-rotation, de-skewing, perspective distortion correction, cropping, etc. as well as production of bi-tonal or gray-scale images using the image. These tasks serve to clean and enhance the image in preparation for data extraction. Indeed, any number of known procedures for preparing a check image for data extraction may be utilized by the check image processing application 128. According to some embodiments, these tasks may have been previously performed by the imaging application 115 of the payor computer system 110 prior to transmitting the image to the bank computer system, and therefore the check image processing application 128 may not necessarily perform some or all of the foregoing enhancement and cleaning tasks.

After the image has been cleaned and enhanced, the image may be processed to extract the data appearing on the face of the check, including the check amount. In particular, the check image processing application 128 is configured to analyze the enhanced image and identify the amount of the check. According to some embodiments, the check image processing application 128 may also be configured to analyze the enhanced image and identify the account of the payor 102 from which the amount will be drawn. In other embodiments, the imaging application 115 of the payor computer system 110 may have previously extracted some or all of the foregoing data, and communicated the data to the bank computer system 120 rather than an image. In such an instance, the check image processing application 128 does not need to extract data from an image.

According to some embodiments, and as shown in block 350, the bank computer system 120 identifies the financial account held by the bank from which the amount appearing on the check will be drafted. There are a number of ways that the bank computer system 120 may make this identification. In addition, although block 350 appears after blocks 330 and 340 in the flow diagram of FIG. 3, it should be understood that the identification of the financial account may occur at any time, including at the time that the check image is received from the payor computer system 110.

In one embodiment, the financial account is identified through the data extraction performed on the check image by the check image processing application 128. In other embodiments, the financial account is identified using information attendant to the transmission of the check image from the payor computer system 110 to the bank computer system 120. For example, according to one embodiment, the bank computer system 120 may identify the financial account based on the email address or telephone number from which the check image was sent. According to another embodiment, the bank computer system 120 may identify the financial account based on the email address or telephone number to which the check image was sent. In such embodiment, the bank computer system 120 may have set up unique addresses for each payor to direct its check images to in order for processing and addition to the online check register as described herein. According to another embodiment, the bank computer system 120 may identify the financial account based on credentials entered by the payor 102 when accessing the online banking application 126, in the event the payor 102 uploaded the check image through online banking. According to yet another embodiment, the bank computer system 120 may identify the financial account based on identification information included in a message sent with the check image. For example, the imaging application 115 on the payor computer system 110 may, once the payor 102 has captured an image, automatically generate a message to be sent to the bank computer system 120 with the check image that includes information identifying the financial account of payor 102 that will be drawn upon when the check is processed for payment. Any of the foregoing and any other known methods of identifying the financial account of the payor 102 may be utilized by the bank computer system 120.

Once the check amount and the financial account of the payor 102 from which the check amount will be drawn have been identified, according to some embodiments and as shown in block 360, the amount is recorded in connection with the financial account as a pending payment. In particular, in some embodiments, the check image processing application 128 communicates the extracted amount and the identified financial account to the account management application 125, which is configured to record the amount as a pending payment in the memory device 123 in connection with the information about the financial account stored there. According to some embodiments, the check amount is recorded in connection with the financial account prior to the payee 104 presenting the check for payment. Thus, even though the payment has not been processed, and, indeed, the payee 104 may not have even received the check yet, the payment ordered by the check has been accounted for in the financial account of the payor 102 as a pending payment so that there is a record of the payment that will be reflected in the online banking account of the payor 102 available through the online banking application 126. This advantageously assists the payor 102 in maintaining an accurate online record of payments and transactions, and prevents the payor 102 from mistakenly overestimating the funds available in the financial account by forgetting about an outstanding check that has been delivered to a payee 104 but not yet cashed by such payee 104.

While it has been discussed that the amount of the check is recorded in the memory device 123 of the bank computer system 120 in connection with the financial account, it should be understood that any information relating to the check may be stored in the memory device 123. For example, in different embodiments, the payor name, payee name, amount, check number, financial account number, check notes, and other information may be extracted from the image and stored in the memory device 123. Furthermore, in addition to the information extracted from the check during processing, the bank computer system 120 may be configured to utilize the account management application 125 to store in connection with the financial account the image of the check received from the payor 102. All of this information, and the image of the check itself, may be accessible to the payor 102 via her online banking account. Thus, at any time, the payor 102 may log onto online banking to retrieve an image of any check that she has wrote and provided to a payee, even where the payee has not yet presented the check for payment. In addition, the image may be retrieved or accessed by the bank computer system 120 for other purposes, such as validating the check when it is eventually presented by the payee 104 for payment.

In recording the amount in connection with the financial account as a pending payment, the bank computer system 120 may treat the amount as a pending payment in a number of different ways. For example, according to one embodiment, the amount may be deducted from the available balance of the financial account, but may be marked as pending rather than complete. In such embodiment, the financial account may have a current balance that is different from the current amount of funds available, as the current amount of funds available would have been deducted based on the outstanding check. Both the current balance and the current amount of funds available would be visible to the payor 102 when viewing the financial account through accessing the online banking application 126. As another example, in one embodiment, the amount may be added to a list of pending payments that may be accessed by the payor 102 through the online banking application 126. As another example, in one embodiment, the amount may be included in the online check register associated with the financial account, as a check that is pending. As used herein, the "online check register" is a listing of the checks associated with a financial account as made available to bank customers though online banking. In such instance, the check would appear as a pending payment rather than one that has already been debited from the account. Thus, according to some embodiments, the amount is recorded as a pending payment in connection with the financial account and, as shown in block 370, made available to be viewed by the payor 102 through the online banking application 128.

According to some embodiments, as shown in block 380, the bank computer system 120 may determine whether the check that has been recorded as a pending payment is ever drawn from the financial account. In particular, the account management application 125 may monitor the financial account such that each time a check is drawn against the account, the account management application compares that check to the checks included in the pending payment list. In the event the account management application 125 determines that one of the checks in the pending payment list has been drawn for payment, as shown in block 400, at the time the payment is processed and debited from the financial account, the account management application 125 converts the amount as it is recorded in connection with the financial account from being a pending payment to an actual payment. According to some embodiments, the account management application 125 may determine that a check being presented for processing is the same as the check that is marked as a pending payment by comparing the data extracted from the check image to the data associated with the check being presented for processing, including the amount and the check number.

According to some embodiments, the payee 104 may present the check for payment by submitting an image of the check, rather than the check itself, to an entity equipped to accept the check and initiate processing of the payment. The image used by the payee 104 may be the same image used by the payor 102 or may be a different one. In some embodiments, after receiving the check from the payor 102, the payee 104 uses a mobile communications device to capture an image of the check and transmit it to a financial institution for payment processing, for example, as a deposit to an account associated with the payee 104 and managed by that financial institution. According to some embodiments, the bank computer system 120 receives the image of the check submitted by the payee 104 to her financial institution when that financial institution initiates communication with the bank computer system 120 in order to process the payment.

In such embodiments, the bank computer system 120 may be configured to compare the check image received for processing of payment to any and all check images submitted by the payor 102 and stored in connection with the financial account, for example, those check images associated with the amounts stored as pending payments in the online check register, and locate a matching check image. In other embodiments, the bank computer system 120 may be configured to locate the check image stored in the memory device 123 that corresponds to the check image received during processing based on information other than the image that is received by the bank computer system 120 during processing. In some embodiments, the bank computer system 120 is configured to compare the two check images to one another in order to validate the check. According to some embodiments, the payee 104 may not be the entity that captured the second image of the check, and indeed, may not capture an image at all. In some embodiments, the financial institution that received the check from the payee 104 when the payee 104 presented the check for payment may capture the image of the check and transmit the image to the bank computer system 120 during processing of the payment for purposes of validation.

Alternatively, in the event the account management application 125 does not identify an incoming check as being the check recorded as a pending payment using the methods discussed herein within a predefined time period, according to some embodiments and as shown in block 390, the bank computer system 120 may communicate to the payor computer system 110 a notification that no payment has been made on the check, and the payment remains pending. According to different embodiments, the payor 102 or the bank may determine the predefined time period that triggers the notification. Referring again to FIG. 2, in the event the payor 102 receives such a notification, as shown in block 250, then, upon receipt of the notification, the payor 102 may decide to cancel the check to avoid payment altogether, as shown in block 260. The notification thus advantageously reminds the payor of the outstanding check and gives the payor the option of canceling the check to avoid any potential exceeding of the balance in the payor's account that might occur based on the delay between delivering the check to the payee 104 and the payee 104 presenting the check for payment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system comprising:
   a communication device configured to receive images;
   a storage device comprising information stored therein relating to a financial account associated with a payor; and
   computer readable program code stored on said storage device or a separate storage device; and
   a processor communicably coupled to said storage device or storage devices, wherein said computer readable program code comprises instructions that when operated by said processor, causes said processor to:
      provide to the payor a web-based online banking account allowing the payor to manage one or more financial accounts and perform one or more transactions using the one or more financial accounts;
      operate the communication device to receive an image of at least a portion of a check, wherein the portion comprises an indication of an amount of money to be drawn on the financial account;

process the image to determine the amount;
amend the information relating to the financial account to include the amount prior to receiving any indication that the check has been presented for payment;
transmit the image of at least the portion of the check to the financial account associated with the payor; and
display, via the online banking account, the image of the check.

2. The system of claim 1, wherein said computer readable program code comprises further instructions that when operated by said processor, causes said processor to:
identify the financial account using the image.

3. The system of claim 1, wherein said computer readable program code comprises further instructions that when operated by said processor, causes said processor to:
identify the financial account using information attendant to transmission of the image to the system.

4. The system of claim 3, wherein the information attendant to the transmission of the image comprises information relating to an address from which the image was transmitted.

5. The method of claim 3, wherein the information attendant to the transmission of the image comprises information obtained by the system when the payor logs onto the online banking account.

6. The system of claim 1, wherein the processor amends the information relating to the financial account to include the amount as a pending payment to be drawn on the financial account.

7. The system of claim 1, wherein said computer readable program code comprises further instructions that when operated by said processor, causes said processor to: make the information relating to the financial account, including the amount, available to be viewed by the payor prior to receiving any indication that the check has been presented for payment.

8. The system of claim 7, wherein the processor amends the information relating to the financial account to include reducing the value of funds available in the financial account by the amount.

9. The system of claim 1, wherein said computer readable program code comprises further instructions that when operated by said processor, causes said processor to:
operate the communication device to receive an indication that a check has been presented by a payee for payment;
determine that the check presented for payment is the same as the check associated with the image of at least a portion of a check;
draw the amount of the check from the financial account; and
amend the information relating to the financial account to include the amount of the check as a debit to the financial account.

10. The system of claim 1, wherein said computer readable program code comprises further instructions that when operated by said processor, causes said processor to:
operate the communication device to receive a second image of at least a portion of the check; and
compare the second image to the image to validate the check.

11. The system of claim 1, wherein said computer readable program code comprises further instructions that when operated by said processor, causes said processor to:
determine that a predefined time period has passed since the image was received;
determine that no indication that the check has been presented by a payee has been received; and
communicate to the payor a notification that the check has not yet been processed for payment.

12. A computer-implemented method comprising:
providing a non-transitory computer-readable medium comprising computer program code stored thereon, wherein said computer program code is specifically configured to cause one or more computer processing devices to perform the following operations when performing the computer program code:
provide to the payor a web-based online banking account allowing the payor to manage one or more financial accounts and perform one or more transactions using the one or more financial accounts;
receiving an image of at least a portion of a paper check, wherein the portion comprises an indication of an amount of money to be drawn on a financial account;
processing the image to determine the amount;
identifying the financial account;
recording the amount in connection with the financial account, wherein said recording step occurs prior to receiving any indication that the check has been presented for payment;
transmitting the image of at least the portion of the check to the financial account associated with the payor; and
displaying, via the online banking account, the image of the check.

13. The method of claim 12, further comprising computer program code specifically configured to cause one or more computer processing devices to perform the following operations when performing the computer program code:
making the financial account with an indication of the pending payment available to be viewed by the payor.

14. The method of claim 12, further comprising computer program code specifically configured to cause one or more computer processing devices to perform the following operations when performing the computer program code:
receiving an indication that a check has been presented by a payee for payment;
determining that the check presented for payment is the same as the check;
drawing the amount of the check from the financial account; and
updating the information stored in connection with the financial account so that the amount of the check is recorded as a debit to the financial account.

15. The method of claim 12, further comprising computer program code specifically configured to cause one or more computer processing devices to perform the following operations when performing the computer program code:
receiving a second image of at least a portion of the check; and
comparing the second image to the image to validate the check.

16. The method of claim 12, further comprising computer program code specifically configured to cause one or more computer processing devices to perform the following operations when performing the computer program code:
determining that a predefined time period has passed since said recording step;
determining that no indication that the check has been presented by a payee has been received; and
communicating to the payor a notification that the check has not yet been processed for payment.

17. The method of claim 12, wherein the image is received from the payor via a network.

18. The method of claim 12, wherein the image was taken using a mobile communication device associated with the payor.

19. The method of claim 12, wherein the financial account is identified by processing the portion of the image to determine a number associated with the financial account.

20. The method of claim 12, wherein the financial account is identified based on information relating to the transmission of the image.

21. The method of claim 20, wherein the information attendant to the transmission of the image comprises information relating to an address from which the image was transmitted.

22. The method of claim 20, wherein the information attendant to the transmission of the image comprises information obtained by the payor logging onto the online banking account.

23. The method of claim 12, wherein making the pending payment available to be viewed by the payor comprises reducing the value of funds available in the financial account by the amount.

24. A computer program product comprising non-transitory a computer-readable medium having computer-executable computer program code portions stored therein, wherein the computer-executable program code portions comprise:
a program code portion configured to provide to the payor a web-based online banking account allowing the payor to manage one or more financial accounts and perform one or more transactions using the one or more financial accounts;
a program code portion configured to receive an image of at least a portion of a check, wherein the portion comprises an indication of an amount of money to be drawn on a financial account associated with a payor;
a program code portion configured to process the image to determine the amount;
a program code portion configured to identify the financial account from which the amount will be drawn after the check is presented for payment;
a program code portion configured to record in connection with the financial account the amount of the check as a pending payment, wherein said recording step occurs prior to receiving any indication that the check has been presented for payment;
a program code portion configured to transmit the image of at least the portion of the check to the financial account associated with the payor; and
a program code portion configured to display, via the online banking account, the image of the check.

25. The computer program product of claim 24, wherein the computer-executable program code portions further comprise:
a program code portion configured to make the pending payment available to be viewed by the payor through the online banking application.

26. A system comprising:
an image capturing device configured to capture images;
a communication device configured to receive images;
a storage device comprising information stored therein relating to a financial account associated with a payor; and
computer readable program code stored on said storage device or a separate storage device; and
a processor communicably coupled to said storage device or storage devices, wherein said computer readable program code comprises instructions that when operated by said processor, causes said processor to:
provide access to a web-based online banking account allowing the payor to manage one or more financial accounts and perform one or more transactions using the one or more financial accounts;
operate the communication device to receive an image of at least a portion of a check, wherein the portion comprises an indication of an amount of money to be drawn on the financial account;
process the image to determine the amount;
amend the information relating to the financial account to include the amount prior to receiving any indication that the check has been presented for payment;
transmit the image of at least the portion of the check to the financial account associated with the payor; an online banking account of the payor; and
display, via the online banking account, the image of the check.

27. The system of claim 26, wherein the image capturing device comprises a camera on a mobile communications device.

28. The system of claim 27, wherein the mobile communications device is configured to transmit images to said communications device.

29. A computer-implemented method comprising:
capturing an image of at least a portion of a paper check, wherein the portion comprises an indication of an amount of money to be drawn on a financial account;
transmitting the image to a processing device configured to process the image to determine the amount;
identifying the financial account;
recording the amount in connection with the financial account, wherein said recording step occurs prior to receiving any indication that the check has been presented for payment;
transmitting the image of at least the portion of the check to the financial account associated with the payor;
providing to the payor a web-based online banking account allowing the payor to manage one or more financial accounts and perform one or more transactions using the one or more financial accounts; and
displaying, via the online banking account, the image of the check.

30. The method of claim 29, further comprising computer program code specifically configured to cause one or more computer processing devices to perform the following operations when performing the computer program code:
making the financial account with an indication of the pending payment available to be viewed by the payor.

31. The method of claim 29, wherein the image is captured using a camera on a mobile communications device.

32. The method of claim 29, wherein the image is transmitted via a network.

* * * * *

UNITED STATES PATENT AND TRADEMARK OFFICE
CERTIFICATE OF CORRECTION

PATENT NO. : 8,676,706 B2  
APPLICATION NO. : 12/847622  
DATED : March 18, 2014  
INVENTOR(S) : Alicia C. Jones Page 1 of 1

It is certified that error appears in the above-identified patent and that said Letters Patent is hereby corrected as shown below:

In the Claims

Claim 26, Column 20, lines 19-20: "an online banking account of the payer;" should be deleted Signed and Sealed this
Thirtieth Day of June, 2015

Michelle K. Lee
*Director of the United States Patent and Trademark Office*